United States Patent [19]

Hutchison et al.

[11] Patent Number: 5,171,055
[45] Date of Patent: Dec. 15, 1992

[54] VEHICLE SEAT MECHANISM

[75] Inventors: Wayne R. Hutchison, Mayville; Richard D. Teal, Horicon, both of Wis.; Steven C. Wasson; David R. Daniel, both of Midland, Mich.

[73] Assignee: Deere & Company, Moline, Ill.

[21] Appl. No.: 715,538

[22] Filed: Jun. 14, 1991

[51] Int. Cl.$^5$ .............................................. B60N 2/08
[52] U.S. Cl. .................. 296/65.1; 296/901; 248/429; 297/311
[58] Field of Search ............... 296/65.1, 901; 297/311; 248/429

[56] References Cited

U.S. PATENT DOCUMENTS

| 3,355,211 | 11/1967 | Kölle .................. 296/65.1 |
| 4,384,701 | 5/1983 | Barley ............... 296/65.1 X |
| 4,544,205 | 10/1985 | Molnar . |
| 4,549,765 | 10/1985 | Hoch . |
| 4,648,657 | 3/1987 | Cox et al. . |
| 4,666,208 | 5/1987 | Tatematsu et al. . |
| 4,666,209 | 5/1987 | Kazaoka et al. . |
| 4,687,251 | 8/1987 | Kazaoka et al. . |
| 4,714,227 | 12/1987 | Holm et al. . |
| 4,725,032 | 2/1988 | Kazaoka et al. . |
| 4,903,931 | 2/1990 | Shimazaki ............ 296/65.1 X |
| 5,037,155 | 8/1991 | Holm et al. . |
| 5,076,529 | 12/1991 | Dove et al. ......... 296/65.1 X |

OTHER PUBLICATIONS

"Preliminary Feasibility Study" containing information generated and provided by employees of The Dow Chemical Co. and Deere & Co., pp. 1-205, including 4 (four) sub-letter pages, co-generated prior to Sep. 1, 1989 and confidentially shared between Dow and Deere in the U.S. Deere & Co., brochure entitled: "John Deere Lawn & Garden Tractors", published in the United States in 1985, front cover and p. 9.

Primary Examiner—Robert R. Song

[57] ABSTRACT

A seat mechanism including a deflectable latch flap mechanism formed integrally with a first seat pan member. The latch flap engages an indexing means for selectively securing the seat in a desired longitudinal position. A guide mechanism is provided for longitudinally guiding foot portions coupled with the seat mechanism during seat position adjustment. Mating portions are provided that generally prevent the guide mechanism from shifting laterally with respect to the seat mechanism under the weight of the operator.

16 Claims, 6 Drawing Sheets

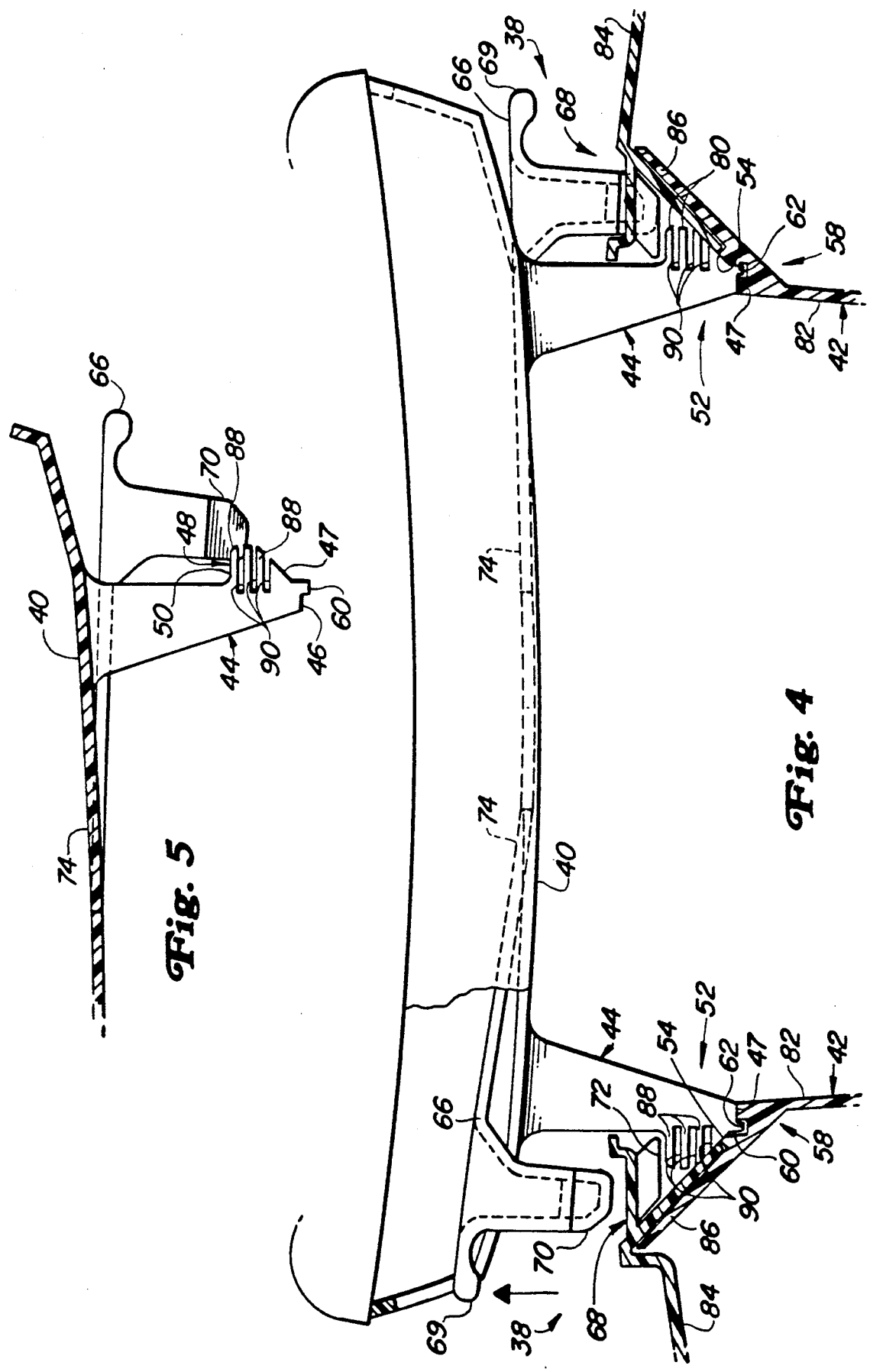

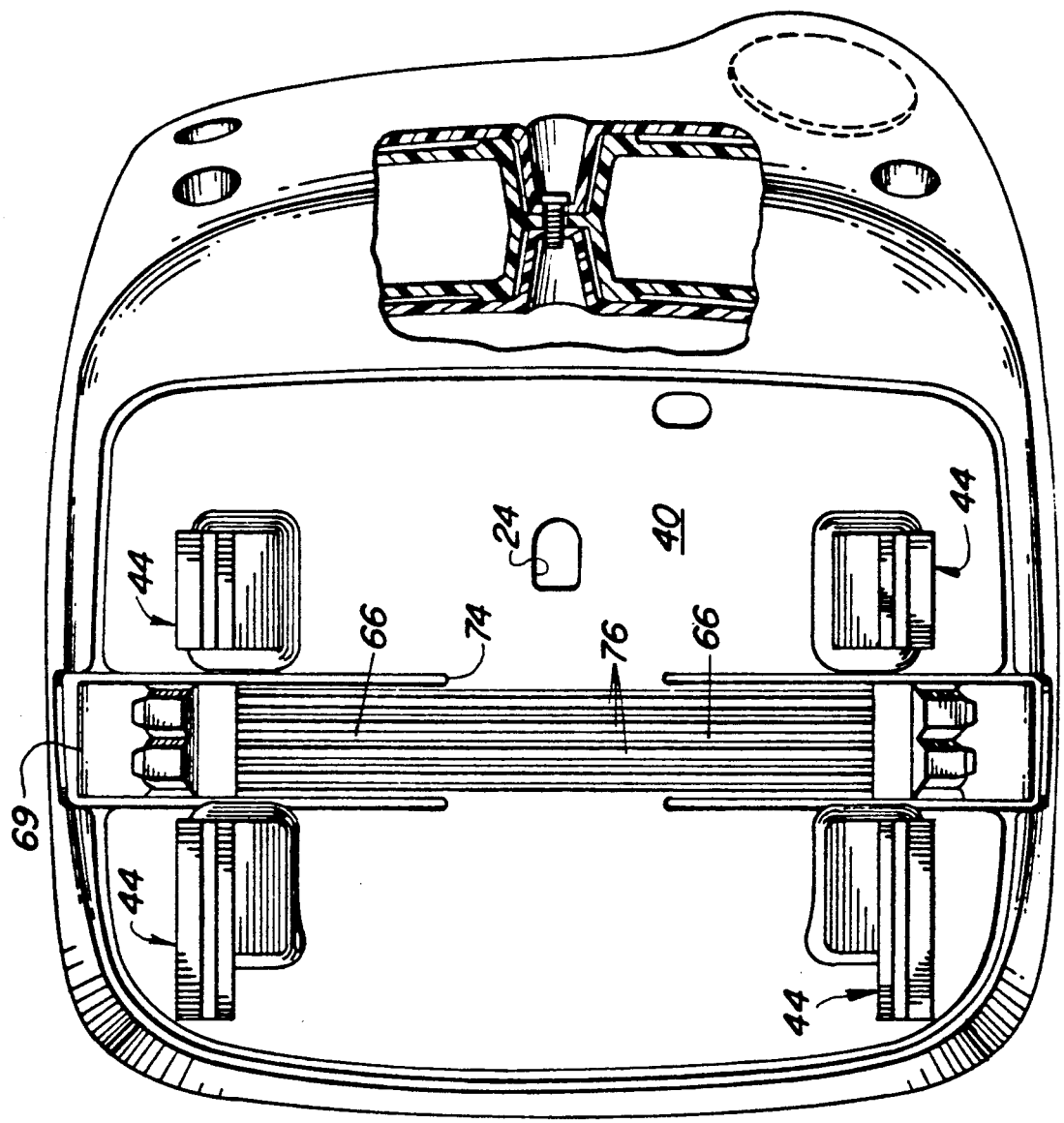

VEHICLE SEAT MECHANISM

BACKGROUND OF THE INVENTION

1. Field of the Invention

The invention relates to seat mechanisms used with vehicles such as lawn and garden tractors.

2. Description of the Related Art

It is known to provide small vehicles such as garden tractors with seats that can be selectively adjusted fore and aft. These prior art seats provide mechanisms that direct or guide the seats longitudinally as the seat's position is changed, and also provide mechanisms for locking or securing the seat in a desired position. Many prior art mechanisms require the use of tools for loosening the seat so it can be adjusted. Other mechanisms allow the operator to loosen the seat for adjustment with his hand. However, many of these hand actuated seat position mechanisms are relatively complex, and include a relatively large number of parts. The cost of the mechanisms is thereby increased. Also, many hand actuated seat adjustment mechanisms require the operator to dismount the vehicle before adjusting the position of the seat.

Therefore, it would be desirable to provide a seat mechanism that is adjustable to a plurality of fore and aft positions without requiring the use of tools. It would be desirable to provide a mechanism that can be adjusted by the operator when he is seated on the vehicle. It would be desirable to provide a mechanism with a means for latching or securing the seat in a desired position such that the latching means includes only a small number of parts. Also, it would be desirable to provide a seat structure having a mechanism for guiding the seat longitudinally that includes a relatively small number of parts.

SUMMARY OF THE INVENTION

A seat mechanism is provided that is usable with a vehicle having a frame. A first seat pan member is provided having a generally horizontal portion upon which the operator may sit, and is formed of a plastic material. A support means supports the first seat pan member above the frame, and is formed of plastic material. The support means has foot portions formed integrally therewith that include a first surface having a horizontal component for transferring the weight of the operator to the frame. The foot portions also include a laterally extending portion that defines an upwardly facing second surface. An indexing means is coupled with the frame and is longitudinally aligned for defining the fore and aft positions at which the first seat pan member can be positioned during vehicle operation. A deflectable latch flap means that is engagable by the hand of the operator is formed integral with the support means to allow selective engagement with the indexing means. The latch flap means is deflectable to a first mode wherein the latch flap is disengaged from the indexing means for selective longitudinal adjustment of the support means. The latch flap means is biased to shift to a second mode wherein the latch flap is engaged with the indexing means for securing the longitudinal position of the support means. A guide means is carried by the frame for receiving and guiding the foot portion during selective longitudinal shifting of the seat mechanism. The guide means defines a first surface having a horizontal component for abutment with the first surface of the foot portion for transferring the weight of the operator and seat mechanism to the guide means. The guide means also defines a second surface that extends laterally for abutment with the second surface of the foot portion for preventing the foot portion from shifting upwardly during operation. Vertically extending mating portions formed in the foot portions and the guide means block the guide means and foot portions from shifting laterally with respect to each other under the weight of the operator.

BRIEF DESCRIPTION OF THE DRAWINGS

FIG. 4 is a cross sectional view of the seat mechanism and guide means according to the preferred embodiment. The latch flap means shown on the left is disengaged from the indexing means, and the latch flap means shown on the right is engaged with the indexing means.

FIG. 5 is a cross sectional view of the support member in its undeflected, manufactured position.

FIG. 7 is a view of the underside of the support member attached with the second seat pan member according to the preferred embodiment.

DESCRIPTION OF THE PREFERRED EMBODIMENT

Figure 1:
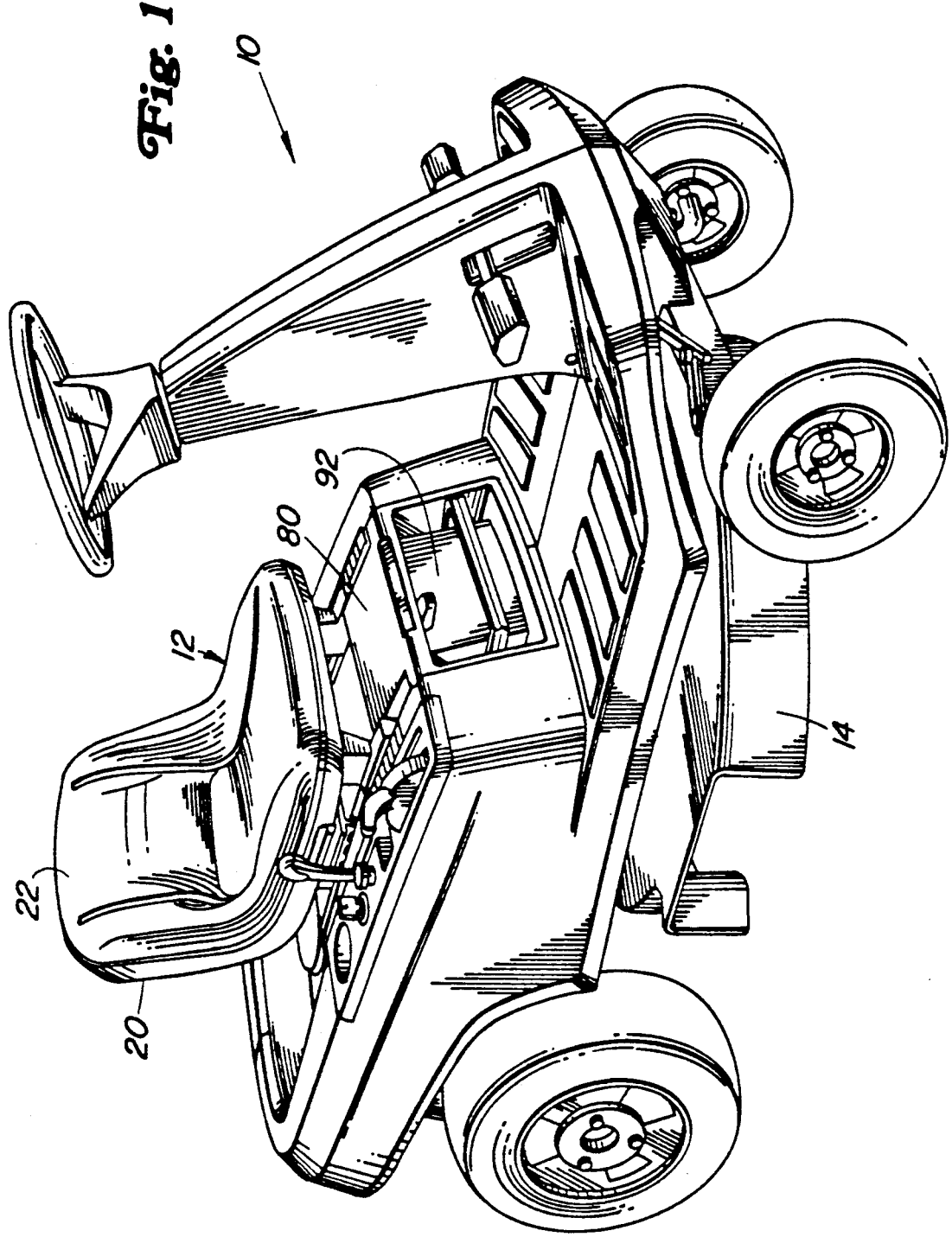
FIG. 1 shows a vehicle carrying the preferred embodiment of the seat mechanism according to the present invention.

Referring to FIG. 1, there is shown a vehicle 10 with which the seat mechanism 12 according to the preferred embodiment of the present invention may be used. The vehicle 10 is adapted for use as a mower, and carries a power source such as an engine, and a mower housing 14 within which a cutter blade is rotatably driven by the power source.

Figure 2:
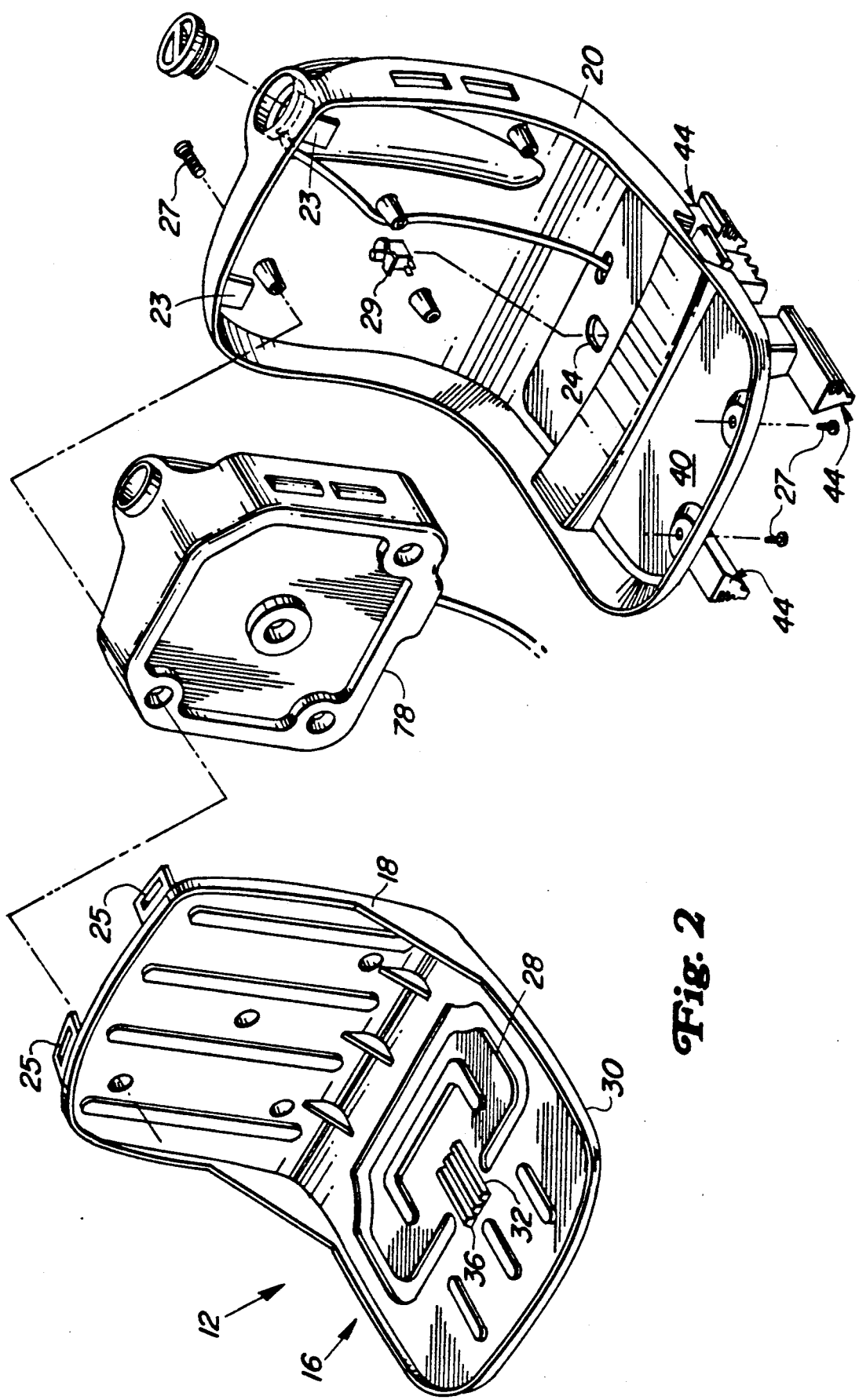
FIG. 2 is an exploded perspective view of the seat mechanism according to the present invention with the seat cushion not shown.
Figure 6:
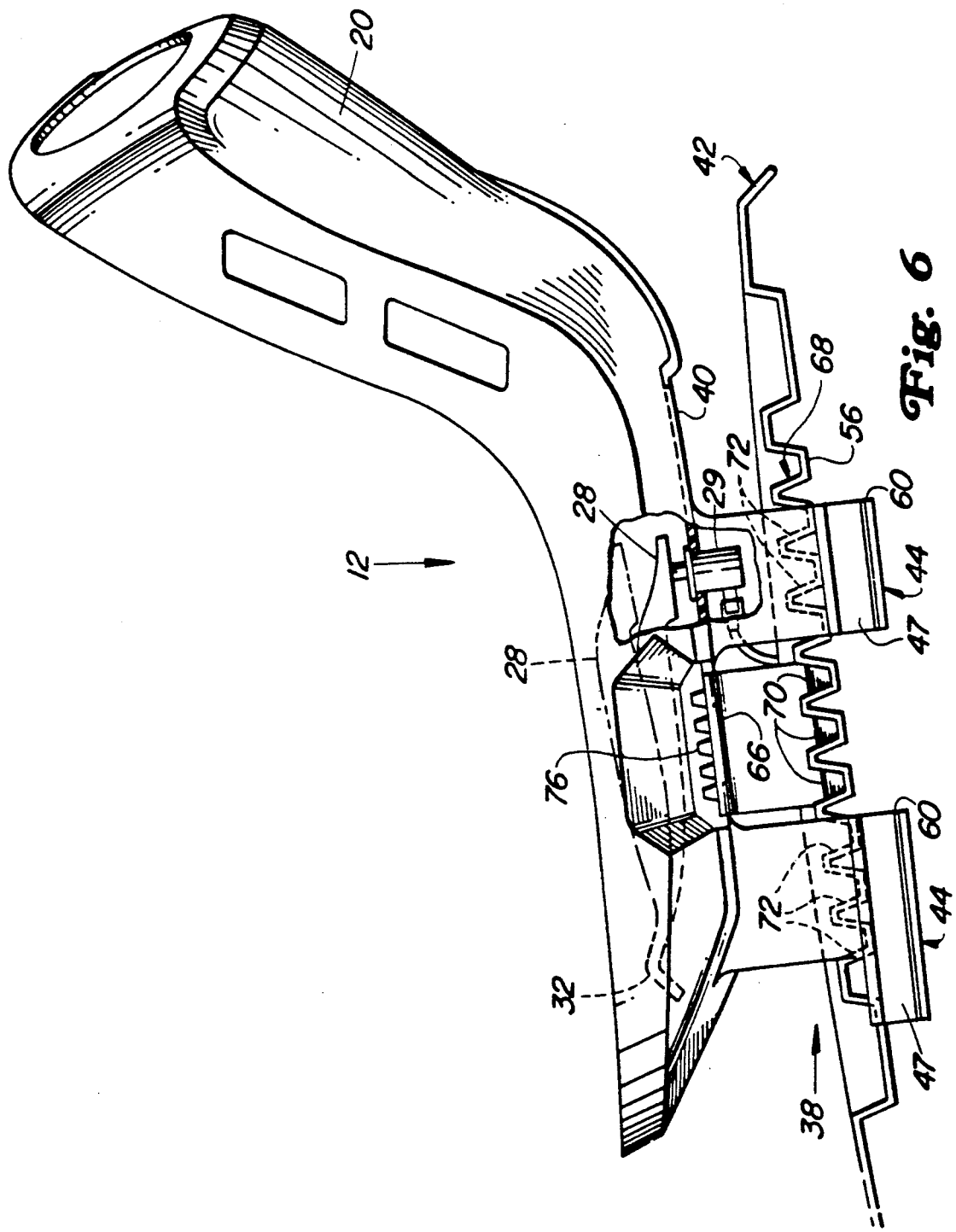
FIG. 6 is a partial side view of the seat mechanism according to the preferred embodiment of the present invention with the seat cushion not shown.

A switch activation mechanism 16 is illustrated in FIGS. 2 and 6. First and second seat pan members 18 and 20 made of injection molded plastic are coupled together during operation. A cushion 22 (as seen in FIG. 1) upon which the operator sits is coupled with the first seat pan 18. As seen in FIG. 2, the first seat pan member 18 is coupled with the second seat pan member 20 via tabs 23 inserted through slots 25 formed in the first seat pan member 18. Screws 27 couple the first seat pan member 18 with the second seat pan member 20. The second seat pan member 20 is positioned below and behind the first seat pan member 18, and carries a switch 29 having a plunger mechanism that snaps into an opening 24 in the support member 40. The switch 29 is electrically coupled with the engine, blade clutch, or other vehicle components for stopping various vehicle operations when the switch 29 is in a disengaged mode. The switch 29 is shifted from the engaged mode to the disengaged mode by a deflectable switch flap 28 formed in a generally horizontal portion 30 of the first seat pan member 18. When the operator sits on the cushion 22 above the generally horizontal portion 30 of the first seat pan 18, a portion of his weight will be positioned over the switch flap 28. The switch flap 28 will therefore deflect downwardly under the weight of the operator to depress the switch 29. A bending portion 32 extends integrally between the first seat pan member 18 and the forward portion of the switch flap 28. The bending portion 32 flexes or bends to allow the switch flap 28 to deflect in response to the operator sitting on the seat 12. Reinforcing ridges 36 are formed in the bending portion 32 to add strength to the bending portion 32 during operation.

A seat position adjustment mechanism 38, as shown fully assembled in FIGS. 4 and 6, allows the operator to selectively shift the seat 12 fore and aft, and to secure the seat 12 in a desired position. Included in the seat position adjustment mechanism 38 is a support means or plastic support member 40, as seen in FIGS. 3-7, that is melt welded or otherwise fixed beneath the second seat pan 20 for supporting the seat mechanism 12 and operator above the frame 42 of the vehicle 10. The support member 40 provides a plurality of foot portions 44 in laterally spaced rows. As shown in FIG. 5, each foot portion 44 includes laterally extending contact surfaces, one surface being essentially level and designated by the number 46, the other surface being inclined and designated by the number 47. Together these first surfaces 46 and 47 provide laterally extending support or contact areas through which the weight of the seat and operator are transferred to the vehicle frame 42. Each foot portion 44 has a laterally extending portion 48 that defines an upwardly facing second surface 50.

A guide means 52, as best seen in cross section in FIG. 4, is defined by the frame 42 according to the preferred embodiment and receives the foot portions 44. The guide means 52 defines a laterally extending first surface 54 which abuts with the first surface 47 of the foot member 44 for transferring at least a portion of the weight of the operator and seat mechanism 12 to the frame 42. The guide means 52 also defines a downwardly facing second surface 56 that extends laterally for abutment with the second surface 50 of the foot portion 44 for preventing the foot portion 44 from shifting upwardly during operation. The guide means thereby acts to securely hold the seat mechanism 12 against the vehicle while also acting to slidably guide the seat mechanism 12 to the desired fore and aft position selection by the operator.

Vertically extending mating portions 58 are formed in the foot portions 44 and the guide means 52 for blocking or preventing the guide means 52 and foot portions 44 from shifting laterally with respect to each other under the weight of the operator. More specifically, the mating portions 58 according to the preferred embodiment include a protruding portion 60 that extends downwardly from the foot portion 44, and a longitudinally extending groove 62 formed in the guide means for slidably receiving the protruding portion 60.

Figure 3:
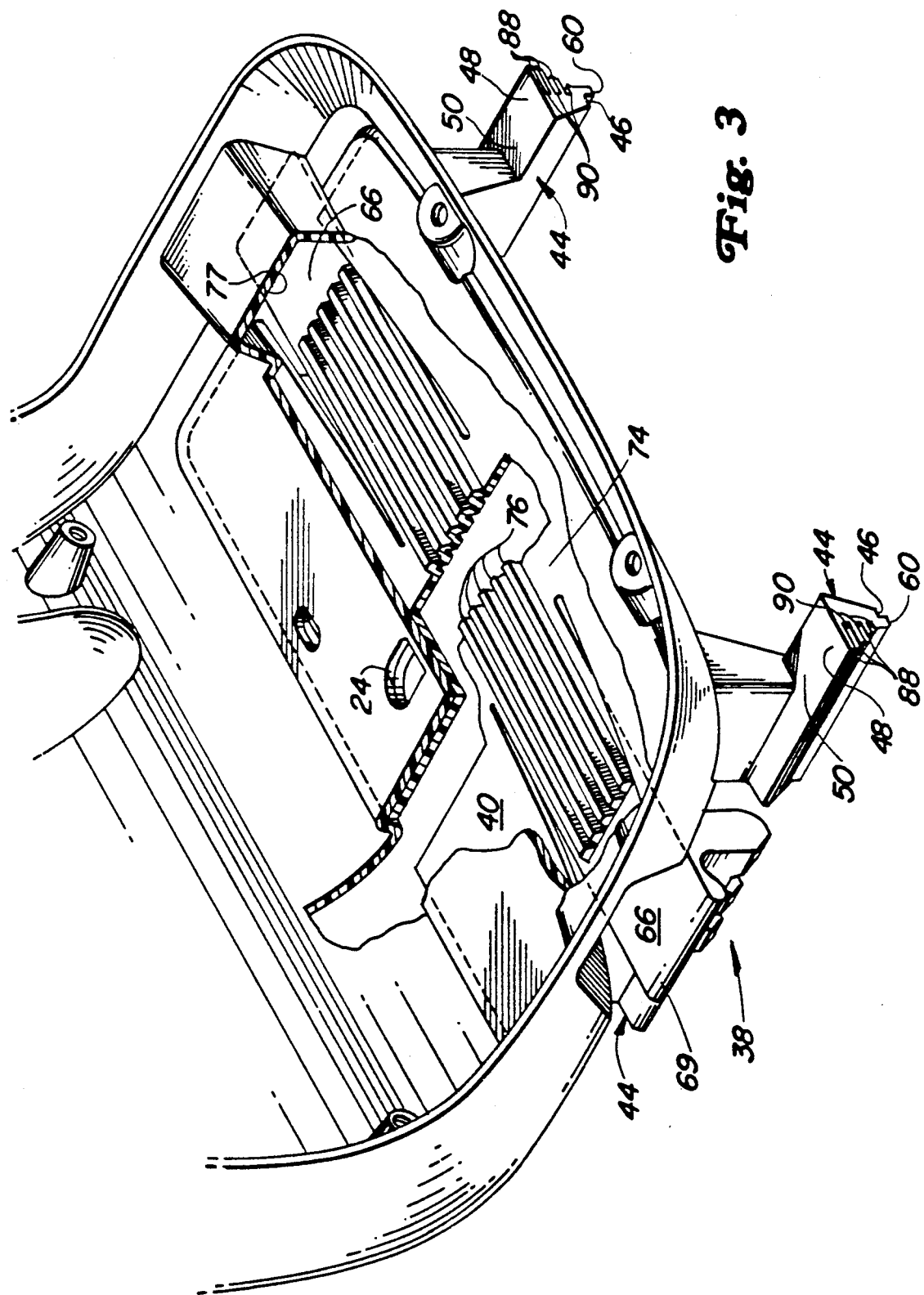
FIG. 3 is a perspective view of the support member and second seat pan showing a portion of the support member and second seat pan member removed to better illustrate the reinforcing ribs formed in the support member. The seat cushion is not shown in FIG. 3.

A mechanism is also provided for securing the seat in a selected longitudinal position. The preferred embodiment provides a pair of deflectable latch flap means 66 formed integral with the support means 40. The latch flap means 66 engages an indexing means 68 defined by the vehicle frame 42, and thereby secures the seat 12 in a selected position. The operator can engage and lift a handle portion 69 of the latch flap means 66 with his hand to deflect the latch flap means 66 upwardly. Once deflected upwardly, the latch flap 66 assumes a first mode wherein the latch flap means 66 is disengaged from the indexing means 68 to allow selective longitudinal shifting of the support means 40 and seat mechanism 12 relative to the vehicle frame 42. The material of the latch flap means 66 biases the latch flap 66 to shift to a second mode wherein they engage the indexing means 68 for securing the support member 40 in a selected position. As best seen in FIG. 6, latch flap means 66 include teeth 70 that are received by longitudinally aligned recesses 72 formed in the indexing means 68 for locking the seat 12 in place. The undersides of the recesses 72 define the second surface 56 of the guide means 52 that blocks the second surface 50 of the foot portions 44 from shifting upwardly during operation. A bending portion 74 is formed integrally between the latch flap means 66 and the support member 40. Reinforcing ridges 76, as seen in FIGS. 3, 6 and 7, are formed in the bending portion 74 for adding strength and rigidity to the bending portion 74. A limiting surface 77, as best seen in FIG. 3, and is defined by the second seat pan member 20. The limiting surface 77 abuts the latch flap member 66 when the latch flap 66 is deflected upwardly, and therefore acts to limit the upward deflection of the latch flap means 66. The operator is thereby prevented from deflecting the latch flap 66 upwardly to a point where the latch flap material would break or otherwise fail.

A fuel tank 78, as best seen in FIG. 2, is also provided in the seat mechanism 12 of the preferred embodiment and is positioned between the back sections of the first and second seat pan members 18 and 20.

Next, the operation of the preferred embodiment will be discussed. When an operator mounts the vehicle 10 he sits on the cushion 22 and thereby places his weight on the horizontal portion 30 of the first seat pan member 18. When the operator sits on the seat mechanism 12 he may wish to adjust the fore and aft position of the seat 12. To do this, he must lift both latch flap means 66 with his hands, which causes the bending portion 74 to flex or bend, and causes the teeth 70 to become disengaged from the recesses 72 in the indexing means 68, as shown on the left in FIG. 4. Once the latch flap means 66 have been lifted, the operator can shift the seat mechanism 12 to a desired position. As the seat 12 shifts, the foot portions 44 are guided longitudinally by the guide means 52. The protruding portions 60 received in the grooves 62 guide the seat mechanism 12 straight back and forth. The first surfaces 47 of the foot portion 44 and the first surface 54 of the guide means also abut each other to guide the seat mechanism 12 in a linear fashion.

When the operator has positioned the seat mechanism 12 at the desired location, he then releases the latch flap means 66. Once released, the latch flap means 66 each deflect downwardly, and the teeth 70 become engaged with the recesses 72 formed in the indexing means 68, as shown on the right in FIG. 4. The teeth 70 received by the recesses 72 prevent or block the seat mechanism 12 from shifting longitudinally during operation.

During manufacture of the preferred embodiment, the support means 40 is formed by injection molding plastic. Referring now to FIGS. 4 and 5, there is shown the latch flap means 66 formed integral with the support means 40. The latch flap means 66 illustrated on the left in FIG. 4 is shown in the raised position, such as when the operator deflects the latch flap 66 upwardly with his hand. The latch flap 66 illustrated on the right in FIG. 4 is shown in secured engagement with the indexing means 68. The latch flap illustrated in FIG. 5 is shown removed from the vehicle, and is in its manufactured, undeflected position. The latch flap means 66 are formed during the manufacturing process in an undeflected position that is lower than the position they will assume when coupled with the indexing means 68. Therefore, when the teeth 70 are received by the recesses 72 of the indexing means 68 as depicted on the right in FIG. 4, the latch flap means 66 is actually deflected upwardly to a position above its manufactured or unflexed position. The internal strength of the latch flap's material biases or urges the latch flap means 66 to flex toward its manufactured or unflexed configuration. Therefore, the internal strength of the material acts as a mechanism for biasing the latch flap means 66 to maintain its engagement with the indexing means 68. Furthermore, when the operator lifts the latch flap means 66 to adjust the position of the seat 12 the latch flap means 66 becomes bent or flexed even further from its manufactured position. When he releases the latch flap means 66, the internal strength of the material will cause the latch flap 66 to spring back toward its unflexed position, and into engagement with the recesses 72 of the indexing means 68. A biasing mechanism is thereby internally provided by the material of the latch flap means 66, and the need for a separate biasing means such as a spring mechanism is eliminated.

The vehicle 10 shown in FIG. 1 provides a compartment 80 beneath the seat mechanism 12 that may contain vehicle components such as a battery. The compartment 80 is defined by generally vertical side wall members 82 (as best seen in FIG. 4) upon which the guide means 52 and indexing means 68 are carried. The seat mechanism 12 serves as the top cover for the compartment 80. The weight of the operator on the seat mechanism 12 will tent to urge the vertical side walls 82 to shift outwardly, which, if allowed to occur, would cause the seat mechanism 12 and operator to shift or slide downwardly within the compartment 80. Similarly, the weight of the operator will tend to urge the foot portions 44 inwardly toward each other, which, if allowed to occur, would cause the seat mechanism to shift downwardly between the vertical side walls 82 and into the compartment. To block the side walls 82 from deflecting laterally and also prevent the foot portions 44 from shifting inwardly, the preferred embodiment provides vertically extending mating portions 58 formed in the foot portions 44 and guide means 52. The mating portions 58 according to the preferred embodiment include a protruding portion 60 that extends downwardly from the foot portion 44, and a groove 62 formed in the guide means 52 for receiving the protruding portion 60. The mating portions 58 block the guide means 52 from shifting laterally with respect to the foot portions 44 under the weight of the operator. Since the guide means 52 are held directly beneath the foot portions 44 by the mating portions 58, the side walls 82 fixed with the guide means 52 will also remain directly beneath the foot portions 44 and will not deflect laterally outwardly. The support means 40 according to the preferred embodiment therefore acts to hold the side walls 82 in an upright configuration. Similarly, the mating portions 58 prevent or block the foot portions 44 from shifting under the weight of the operator. Therefore, the vertical side walls 82 of the compartment 80, as well as the foot portions 44 of the support member 40 can be constructed of a relatively weak and inexpensive material, such as a plastic material.

FIG. 4 illustrates a cross sectional view of the guide means 52 and indexing means 68 according to the preferred embodiment. A first structural member 84 made of an injection molded plastic material is bonded to a second structural member 86 made of a composite material. The first structural member 84 extends laterally and serves as the vehicle body. The recesses 72, groove 62, and first and second surfaces 54 and 56 of the guide means 52 are all formed integrally with the first or second structural members 84 and 86. The number of separate parts is thereby reduced and the cost to manufacture and assemble the mechanism is reduced.

As seen in FIG. 3 the laterally extending portion 48 of the foot portion 44 can be provided with rib members 88 having horizontal slots 90 formed therebetween. The rib members 88 define a portion of the foot portion's first surface 46. The presence of the slots 90 can reduce the amount of material used to manufacture the support means 40, and can also reduce the time required for the support means 40 to cool during the injection molding manufacturing process. The use of rib members 88 and slots 90 therefore reduces the cost of manufacturing the support means 40.

The seat mechanism 12 can be entirely removed from the vehicle 10. A battery cover 92 defines the front wall of the compartment 80, and also defines the forward wall of the guide means 52. When in a compartment enclosing position, the battery cover thereby blocks or prevents the foot portions 44 from shifting forwardly out of the guide means 52. When the battery cover 92 has been removed from the vehicle, the foot portions 44 can be shifted forwardly out of the guide means 52 and thereby removed from the vehicle 10.

I claim:

1. A seat adjustment mechanism for use with a vehicle having a frame, comprising:
   a first seat pan upon which the operator may sit during vehicle operation;
   a support means coupled beneath the first seat pan for slidably supporting the first seat pan above the frame;
   indexing means coupled with the frame extending longitudinally for defining the fore and aft positions at which the first seat pan can be positioned during vehicle operation; and
   deflectable latch flap means engagable by the hand of the operator and formed integral with the support means for selective engagement with the indexing means, said latch flap means being deflectable to a first mode wherein the latch flap is disengaged from the indexing means for selective longitudinal adjustment of the support means, said latch flap means being biased to shift to a second mode wherein the latch flap is engaged with the indexing means for securing the longitudinal position of the support means.

2. The invention of claim 1, wherein the support means and latch flap are formed of a plastic material.

3. The invention of claim 1, wherein the latch flap means includes a bending portion that is formed integrally between the support means and the latch flap means for bending when the operator shifts the latch flap means from its first mode to its second mode.

4. The invention of claim 1, and further comprising:
   recesses defined in the indexing means; and
   teeth formed in the latch flap means for engaging the recesses defined in the indexing means.

5. The invention of claim 1, wherein the material of the latch flap means biases the latch flap means toward engagement with the indexing means.

6. The invention of claim 5, wherein the latch flap means is in an undeflected position when removed from the vehicle, is deflected from its undeflected position when installed on the vehicle and engaged with the indexing means, and is deflected further from the undeflected position when mounted on the vehicle and disengaged from the indexing means for fore and aft shifting of the support means.

7. A seat adjustment mechanism for use with a vehicle having a frame, comprising:
   a first seat pan upon which the operator may sit during vehicle operation;
   a support means coupled beneath the first seat pan for slidably supporting the first seat pan above the frame;
   indexing means coupled with the frame and having longitudinally aligned recesses for defining the fore and aft positions at which the first seat pan can be positioned during vehicle operation;
   deflectable latch flap means engagable by the hand of the operator and formed integral with the support means for selective engagement with the indexing means, said latch flap means having teeth formed therein engagable with the recesses of the indexing means, said latch flap means being deflectable to a first mode wherein the teeth are disengaged from the recesses for selective longitudinal adjustment of the support means, the material of said latch flap means serving to bias the latch flap means to shift to a second mode wherein the teeth become engaged with the recesses for securing the longitudinal position of the support means, the material of said latch flap means serving to also bias the latch flap means to shift past the second mode and to a third, undeflected mode once the support means is removed from the vehicle.

8. The invention of claim 7, wherein said support means and latch flap means are formed of a plastic material.

9. The invention of claim 7, wherein the latch flap means includes a bending portion that is formed integrally between the support means and the latch flap means for bending when the operator shifts the latch flap means from its first mode to its second mode.

10. The invention of claim 9, and further comprising reinforcing ridge means formed in the bending portion for reinforcing the strength of the bending portion.

11. A seat mechanism usable with a vehicle having a frame, comprising:
   a first seat pan member coupled with the vehicle and on which the operator sits during operation of the vehicle, said first seat pan member having a generally horizontal portion upon which the operator sits; p1 a support means coupled beneath the first seat pan member for supporting the first seat pan member above the frame;
   at least one foot portion formed integral with the support means, said foot portion including a laterally extending first surface for transferring the weight of the operator and seat mechanism to the frame, said foot portion having a laterally extending and upwardly facing second surface;
   guide means formed integral with the frame for slidably receiving and guiding said foot portion during selective longitudinal shifting of the seat mechanism, said guide means defining a first laterally extending surface abutable with said first surface of the foot member for receiving the weight of the operator and seat mechanism, said guide means defining a second surface that extends laterally for abutment with the second surface of the foot portion for preventing the foot portion from shifting upwardly during operation; and
   vertically extending mating portions formed in the foot portions and the guide mans said mating portions acting to block the guide mans and foot portion from shifting laterally with respect to each other under the weight of the operator.

12. The invention of claim 11, wherein the support means and foot portion are formed of a plastic material.

13. The invention of claim 11, wherein the guide mans is formed of a plastic material.

14. The invention of claim 11, wherein said mating portions further comprise:
   a protruding portion that extends downwardly from the foot portion; and
   a groove formed in the guide means for receiving the protruding portion.

15. The invention of claim 11, wherein at least two laterally spaced foot portions are provided, and the weight of the operator tends to urge the foot portion laterally, and the guide means are urged laterally outwardly by the weight of the operator, said vertically extending mating portions being formed in the foot portions and the guide mans for blocking the guide means and foot portion from shifting laterally with respect to each other under the weight of the operator.

16. A seat mechanism usable with a vehicle having a frame, comprising:
   a first seat pan member coupled with the vehicle and on which the operator sits during operation of the vehicle, said first seat pan member having a generally horizontal portion upon which the operator sits;
   a support means coupled beneath the first seat pan member for supporting the first seat pan member above the frame, said support means being formed of a plastic material;
   at least two laterally spaced foot portions formed integral with the support means, said foot portions including laterally extending first surfaces for transferring the weight of the operator and seat mechanism to the frame, said foot portions having a laterally extending portion that defines an upwardly facing second surface;
   guide means formed integral with the frame for slidably receiving and guiding said foot portions during selective longitudinal shifting of the seat mechanism, said guide means being formed of a plastic material, and defining a laterally extending first surface abutable with said first surface of the foot members for transferring the weight of the operator and seat mechanism to the frame, said guide means defining a second surface that extends laterally for abutment with the second surface of the foot portions for preventing the foot portions from shifting upwardly during operation; and
   vertically extending mating portions formed in the foot portions and the guide means for blocking the guide means and foot portion from shifting laterally with respect to each other under the weight of the operator, wherein said mating portions further comprise
   a protruding portion that extends downwardly from each foot portion; and
   a groove formed in the guide means for receiving each protruding portion.

* * * * *

UNITED STATES PATENT AND TRADEMARK OFFICE
CERTIFICATE OF CORRECTION

PATENT NO. : 5,171,055
DATED : December 15, 1992
INVENTOR(S) : Hutchison et al.

It is certified that error appears in the above-identified patent and that said Letters Patent is hereby corrected as shown below:

Column 7, line 55, delete "pl".

Column 8, line 7, delete "mans" and insert therefore --means--.

Column 8, line 8, delete "mans" and insert therefore --means--.

Column 8, line 14, delete "mans" and insert therefore --means--.

Column 8, line 26, delete "mans" and insert therefore --means--.

Signed and Sealed this

Twenty-third Day of November, 1993

Attest:

BRUCE LEHMAN

Attesting Officer

Commissioner of Patents and Trademarks